Aug. 24, 1926.
W. C. DEVER
1,597,515
TESTING REFRIGERANT FLUIDS
Original Filed August 1. 1925
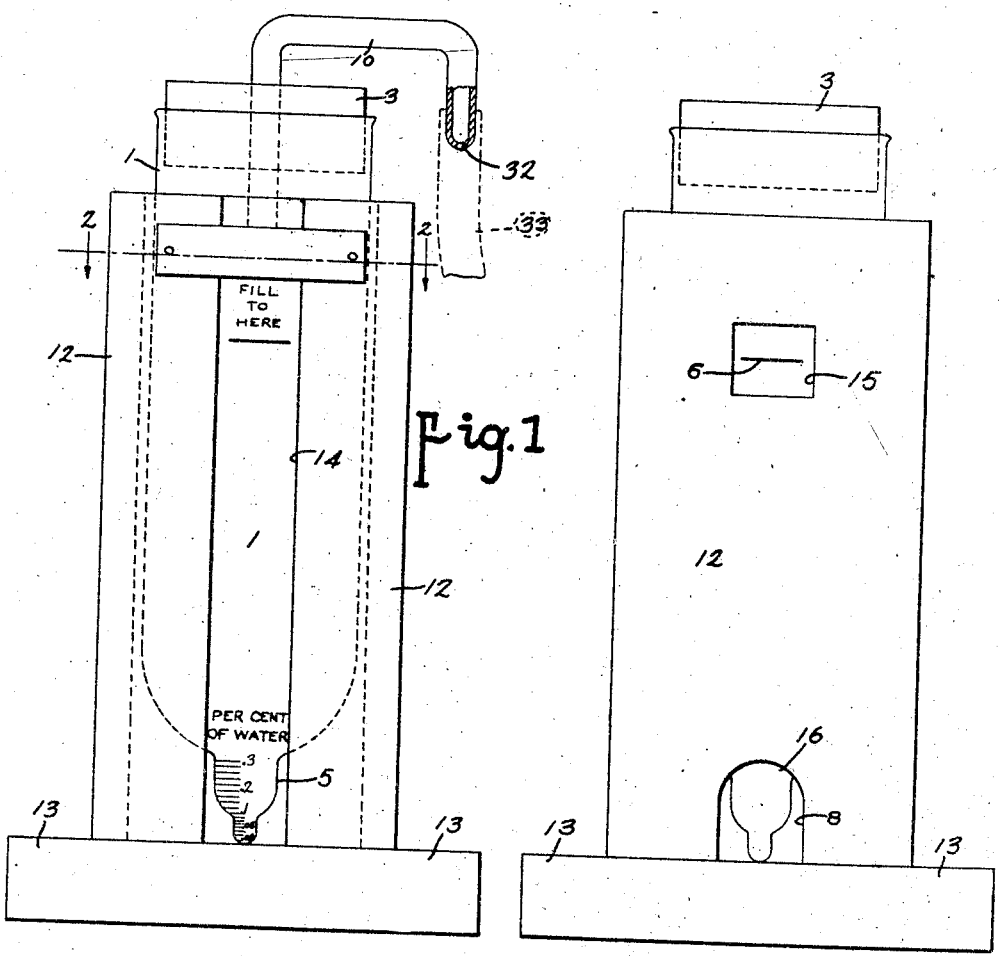
Fig.1
Fig.3
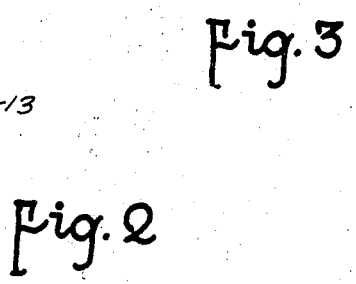
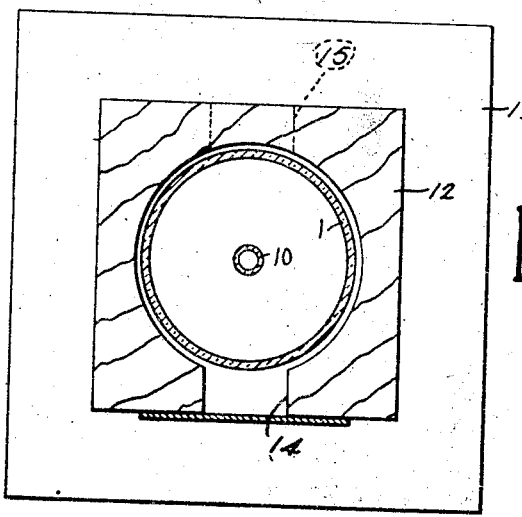
Fig.2
William C. Dever
Inventor
by Smith & Freeman
Attorneys Patented Aug. 24, 1926.

1,597,515

UNITED STATES PATENT OFFICE.

WILLIAM C. DEVER, OF DETROIT, MICHIGAN, ASSIGNOR TO KELVINATOR CORPORATION, OF DETROIT, MICHIGAN, A CORPORATION OF MICHIGAN.

TESTING REFRIGERANT FLUIDS.

Original application filed August 1, 1925, Serial No. 47,507. Divided and this application filed April 22, 1926. Serial No. 103,889.

This application is a division of my copending case, Serial No. 47,507 filed Aug. 1, 1925.

This invention relates to testing apparatus and has for its object the provision of a simple, practical and reliable apparatus testing refrigerants technically for their moisture content. Sulphur dioxide for example is successful as a refrigerant only when substantially free from moisture inasmuch as any appreciable quantity of dissolved water reacts upon the sulphur dioxide with the production of corrosive fluid, while any presence of atmospheric oxygen in addition to the moisture enhances the corrosive effect with the result that pistons bind, valves stick, pipes become corroded, and lubrication is injured; while if the refrigerant be anhydrous it exhibits no injurious effect upon the mechanism. I have discovered that the maximum permissible water content is about .06% and the herein described improvements in apparatus and method have been devised for the purpose of facilitating analysis by comparatively untra'ned men and equally available to the maker and the user of sulphur dioxide. Water in other refrigerants is sometimes objectionable because of freezing.

In the drawings accompanying and forming a part of this application Fig. 1 illustrates a side elevation of a simplified apparatus for the performance of my testing process; Fig. 2 is a sectional view corresponding to the lines 2—2 of Fig. 1; and Fig. 3 is a rear elevation of the apparatus shown in Fig. 1.

1 denotes a glass vessel having a cylindrical mouth 2 adapted for the reception of a rubber stopper 3 or other tightly fittings, removable closure, and having its lower end reduced in diameter to form a prolong 4 which in turn is again reduced to form a second prolong 5, the latter closed by an integral bottom 6. In the form shown the body of the vessel thus produced has a capacity of between 200 and 300 cubic centimeters, the prolong 4 a capacity of approximately 1 cubic centimeter and the prolong 5 a capacity of approximately $\frac{1}{10}$ cubic centimeter. I have found the following approximate dimensions very convenient; diameter of body 1½ inch, length of upper cylindrical portion 8 inches; diameter of first prolong $5/16$ inch; length of first prolong 1½ inch; diameter of second prolong $3/32$ inch; length of second prolong ½ inch; total length of tube 10 inches.

This tube is accurately graduated on the lower prolong to $\frac{1}{100}$ of a cubic centimeter. The larger prolong is graduated to $\frac{1}{10}$ cubic centimeter; and the body of the tube is graduated at say 100 c. c. with a suitable level indication such as shown at 6. It need not be at 100 c. c. for both it and the other graduations may be empirical if desired; in fact this is a very desirable arrangement.

This stopper is here shown as coupled by means of a glass tube 10 to a rubber connection 11 which leads to some point of convenient discharge for the evolved gas. The end of the tube 32 is here partly closed to reduce inflow of air which might bring moisture.

The apparatus is prepared for the test as follows:

In order to conduct a test a fresh representative sample of the refrigerant liquid is introduced into the clean and dry tube 1, this tube being preferably at about room temperature filling same to the mark 6. It is then quickly closed by the stopper 3 (in order to minimize the opportunity of absorbing moisture from the atmosphere) and the apparatus connected as shown in the drawing and the volatile fluid allowed to evaporate naturally at room temperature until as much of the same has disappeared as will pass off under these conditions. This ordinarily requires several hours and it is best to distil it slowly since less water is evaporated under such condition. The tube 1 is allowed to assume room temperature (the evaporation of the volatile liquid always cools it much below this point), and the amount of residuum noted. The fact of the tube's assuming room temperature is the indication that only water or other non-volatile liquid remains.

In case the amount of liquid remaining in the bottom of the tube is sufficient to fill the prolongs 4 and 5 it is obvious at a glance that the liquid is unduly impure for refrigerating purposes. Ordinarily the residue should not more than half fill the smaller prolong and the same is reduced to percentage by application of the formula $P = V/1.49$, wherein $P$ = percentage of water by weight and 1.49 is the specific gravity of liquid sulphur dioxide, assuming that to be the substance under test. Thus in case the tube shows a residue of .03 c. c. the percentage of water corresponding thereto is .03/1.49=.020.

Part of the water content also distills away with the volatile liquid but this amount bears substantially a constant proportion to that left behind, in case the evaporation is conducted gradually and at moderate temperatures. By comparing the results exhibited by this apparatus with a complete chemical analysis of companion samples a correction factor is obtained which can be applied to the observed reading with that particular liquid and a determination made within a sufficient degree of accuracy for all practical purposes. Of course different liquids will require different correction factors. Thus with sulphur dioxide the amount of water which distils over is generally about the same as that remaining behind, but with ammonia the ratio is very different.

It is also possible and is within my invention to calibrate the prolongs of the tube 1 so as to exhibit directly the percentage of water present, although this means that the tube so calibrated can be used only for the one liquid for which it was designed. The calibration now takes care of the difference in specific gravity as well as the amount of water distilling over. This means that the calibration is wholly empirical, each mark being evaluated by a special analysis; and for this reason the mark 6 need not designate any standard volume but may be placed whenever convenient. This mode of procedure avoids all weighing, all handling of chemicals, and affords a determination sufficiently exact for most purposes. It is important, however, in this case, to force the refrigerant to evaporate at a uniform rate, and to compel this I prefer to enclose it in a suitable jacket which shall both hold it upright and regulate the rate of heat absorption. Such a device is shown at 12, and here comprising a hollow wooden upright carried by a base 13 and adapted to receive the tube 1. The upright has a slot or opening 14 in front to permit inspection of the liquid level, and is formed at the back with windows 15 and 16 opposite the graduations to facilitate reading the same.

It will be obvious that many changes can be made within the scope of my invention wherefore I do not limit myself in any wise except as specifically recited in my several claims which I desire may be construed, each independently of limitations contained in other claims.

Having thus described my invention what I claim is:

1. Apparatus for determining the percentage of water in liquid refrigerant media comprising a glass container having a liquid level line, a removable closure for the upper end of said container, and a reduced prolong at the lower end thereof, said prolong having graduations thereon which indicate directly the percentage of water by weight which is indicated by a corresponding residuum, said graduations being adjusted to compensate for the amount of water vapor distilling off with the volatile component.

2. Apparatus for determining the percentage of water in liquid refrigerant media comprising a glass container having a liquid level line, a removable closure for the upper end of said container, and a reduced prolong at the lower end thereof, said prolong having graduations thereon which indicate directly the percentage of water by weight which is indicated by a corresponding residuum, said graduations being adjusted to compensate for the amount of water vapor distilling off with the volatile component, and means for maintaining the distillation conditions approximately constant as regards the rate of access of heat to said tube.

3. Apparatus for determining the percentage of water in liquid refrigerant comprising a glass container having a liquid level line, a removable closure for the upper end of said container, and a reduced prolong at the lower end thereof, said prolong having graduations thereon which indicate directly the percentage of water by weight which is indicated by a corresponding residuum, said graduations being adjusted to compensate for the amount of water vapor distilling off with the refrigerant, and a heat obstructing casing surrounding said tube and having openings opposite said graduations.

4. Apparatus for determining approximately the percentage of water in liquid sulphur dioxide comprising a glass container of substantial size having a liquid level indication thereon and also having at its lowest part a constricted well graduated into volumes ranging from about one ten thousandth to about one one thousandth of the the volume indicated by said liquid level indication, and a partial closure for said container adapted to allow gas to escape while preventing air from entering.

5. Apparatus for determining approximately the percentage of water in liquid sulphur dioxide comprising a glass container of substantial size having a liquid level indication thereon and also having at its lowest part a constricted well graduated into volumes ranging from about one ten thousandth to about one one thousandth of the volume indicated by said liquid level indication, a partial closure for said container adapted to allow gas to escape while preventing air from entering, and a shield for said container adapted to restrict the rate of heat absorption.

6. Apparatus for determining approximately the percentage of water in liquid refrigerants comprising a glass container of substantial size having a liquid level indication thereon and also having at its lowest part a constricted well graduated into volumes ranging from about one-ten thousandth to about one one thousandth of the volume indicated by said liquid level indication, and a supporting device for said container adapted to restrict the rate of heat absorption thereby.

7. Apparatus for determining approximately the percentage of water in liquid refrigerants comprising a glass container of substantial size having a liquid level indication thereon and also having at its lowest part a constricted well graduated into volumes ranging from about one ten thousandth to about one one thousandth of the volume indicated by said liquid level indication, and a hollow wooden casing closely receiving said container and holding it upright, said casing having windows revealing the graduations and liquid level indications.

In testimony whereof I hereunto affix my signature.

WILLIAM C. DEVER.